US012766738B2

(12) United States Patent
Bonin et al.

(10) Patent No.: US 12,766,738 B2
(45) Date of Patent: Oct. 20, 2026

(54) METHOD AND SYSTEM FOR OPERATING A ROBOT

(71) Applicant: KUKA Deutschland GmbH, Augsburg (DE)

(72) Inventors: Uwe Bonin, Augsburg (DE); Dennis Schimmel, Augsburg (DE); Marc-Walter Ueberle, Friedberg (DE); Giulio Milighetti, Augsburg (DE); Florian Groschup, Augsburg (DE)

(73) Assignee: KUKA Deutschland GmbH (DE)

( * ) Notice: Subject to any disclaimer, the term of this patent is extended or adjusted under 35 U.S.C. 154(b) by 329 days.

(21) Appl. No.: 18/256,713

(22) PCT Filed: Nov. 11, 2021

(86) PCT No.: PCT/EP2021/081321
§ 371 (c)(1),
(2) Date: Oct. 16, 2023

(87) PCT Pub. No.: WO2022/128270
PCT Pub. Date: Jun. 23, 2022

(65) Prior Publication Data

US 2025/0065511 A1 Feb. 27, 2025

(30) Foreign Application Priority Data

Dec. 15, 2020 (DE) ..................... 10 2020 215 904.1

(51) Int. Cl.
*B25J 13/06* (2006.01)
*B25J 9/16* (2006.01)

(52) U.S. Cl.
CPC ............. *B25J 13/06* (2013.01); *B25J 9/1664* (2013.01)

(58) Field of Classification Search
CPC ........... G05B 2219/37537; G05B 2219/39218; G05B 2219/39224; G05B 2219/40332;
(Continued)

(56) References Cited

U.S. PATENT DOCUMENTS

2015/0290796 A1* 10/2015 Iwatake ................. B25J 9/0081 700/258
2017/0266809 A1 9/2017 Shikina et al.
2017/0285625 A1* 10/2017 Sato ....................... B25J 9/1633

FOREIGN PATENT DOCUMENTS

DE 102017204211 A1 9/2017
DE 102019118263.8 B3 8/2020
DE 102019118263 B3 * 8/2020 ............ B25J 13/088

OTHER PUBLICATIONS

European Patent Office; Search Report in related International Patent Application No. PCT/EP2021/081321 dated Feb. 9, 2022; 2 pages.

(Continued)

*Primary Examiner* — Nhi Q Bui
(74) *Attorney, Agent, or Firm* — Dorton & Willis, LLP

(57) ABSTRACT

In a method and system for operating a robot, at least one first direction, in which an external load acting on a reference is not reliably detectable on the basis of detected joint loads due to the vicinity to a singular position of the robot, is displayed as not being monitored on the basis of detected joint loads, and/or at least one second direction, in which an external load acting on the reference is reliably detectable on the basis of detected joint loads despite the vicinity to the singular position, is displayed as being monitorable on the basis of detected joint loads. Additionally or alternatively, at least one first direction is blocked if an external load acting on the reference in said direction is not reliably detectable on the basis of detected joint loads due to the vicinity to a singular position of the robot, and if at least one direction is (Continued)

blocked and multiple joints of the robot are simultaneously actuated, a monitoring process is carried out on the basis of detected joint loads for an external load acting on the reference in at least one second direction, in which an external load acting on the reference is reliably detectable on the basis of detected joint loads despite the vicinity to the singular position.

11 Claims, 1 Drawing Sheet

(58) Field of Classification Search
CPC . G05B 2219/40333; G05B 2219/40599; B25J 9/1664; B25J 9/1643; B25J 9/1676; B25J 9/1633; B25J 9/1607; B25J 9/1674; B25J 13/06
See application file for complete search history.

(56) References Cited

OTHER PUBLICATIONS

Chinese Patent Office; Office Action in related Chinese Patent Application No. 202180084655.X 1 dated Aug. 23, 2025; 7 pages.
Chinese Patent Office; Office Action in related Chinese Patent Application No. 202180084655.X dated Aug. 23, 2025; 7 pages.
Korean Patent Office; Office Action in related Korean Patent Application No. 10-2023-7023194 dated Mar. 30, 2026; 8 pages.

* cited by examiner

METHOD AND SYSTEM FOR OPERATING A ROBOT

CROSS-REFERENCE TO RELATED APPLICATIONS

This application is a national phase application under 35 U.S.C. § 371 of International Patent Application No. PCT/EP2021/081321, filed Nov. 11, 2021, which claims the benefit of priority to German Patent Application No. DE 10 2020 215 904.1, filed Dec. 15, 2020, the disclosures of which are incorporated by reference herein in their entirety.

TECHNICAL FIELD

The present invention relates to a method for operating a robot, as well as to a system and to a computer program product for performing the method.

BACKGROUND

In robots, a transposed Jacobian matrix J, which results from the differentiation of a velocity of a robot-fixed reference according to joint velocities, transforms loads f on a robot-fixed reference, for example the Tool Center Point (TCP), and joint loads τ caused thereby into each other:

$$\tau = J^T \cdot f$$

In principle, this conversely allows the determination of external loads on the basis of detected joint loads, and therefore in particular allows the monitoring of the robot during a movement for collisions, in particular pinching/squeezing situations, at the reference by monitoring corresponding load limit values and the like.

However, in the vicinity of singular positions of the robot, the Jacobian matrix is poorly conditioned, and a drop in rank results in singular positions, so that in the vicinity of singular positions, in particular due to measurement noise, numerical effects and the like, the precision of determining external loads on the basis of detected joint loads may be affected.

DE 10 2017 204 211 A1 therefore heuristically proposes rotating joints only individually when a robot "has been" in the vicinity of a singular configuration.

However, this profoundly restricts the movement options.

SUMMARY

The object of the present invention is to improve the operation of a robot.

This object is achieved by a method, a system, and computer program product for performing a method as described herein.

According to one embodiment of the present invention, in particular for planning and/or performing a movement of a robot-fixed reference of a robot, at least one first direction is displayed in one embodiment as not being monitored on the basis of detected joint loads by being displayed as such or by a corresponding identification such as a color or the like, in which direction an external load on the reference is not reliably detectable on the basis of detected joint loads due to the vicinity to a singular position of the robot or for which direction it has been determined that an external load on the reference is not reliably detectable due to the vicinity to a singular position of the robot on the basis of detected joint loads, in particular if it has been determined that an external load on the reference in said first direction is not reliably detectable due to the vicinity to a singular position of the robot on the basis of detected joint loads, and/or at least one direction, which is designated as a second direction without loss of generality, in particular without necessarily presupposing a first direction, is displayed in one embodiment as being monitorable on the basis of detected joint loads by being displayed as such or by a corresponding identification such as a (possibly different) color or the like, in which direction an external load on the reference is reliably detectable on the basis of detected joint loads despite the vicinity to a singular position of the robot or for which direction it has been determined that an external load on the reference is reliably detectable on the basis of detected joint loads despite the vicinity to a singular position of the robot, in particular if it has been determined that an external load on the reference in said second direction is reliably detectable on the basis of detected joint loads despite the vicinity to a singular position of the robot.

As a result, in one embodiment, for planning the movement, it is possible to check whether a non-reliably detected or detectable external load would represent an (excessively high) risk in a certain direction and, in one embodiment, the movement and/or environment can be appropriately replanned, or can be accepted, since for example there is enough evasion space in this direction to avoid pinching, there are or can be no obstacles in this direction, or the like.

In this way, more movement options of the robot can be used in one embodiment and/or safety can be increased, and the operation of the robot can thereby be improved.

Similarly, during the performance of the movement, it can be taken into account that the external load is not (cannot be) reliably detected in a specific direction, and it is decided during operation whether this direction, for example due to sufficient evasion space, a lack of obstacles or the like, is nevertheless used or avoided.

In this way, more movement options of the robot can be used in one embodiment and/or safety can be increased, and the operation of the robot can thereby be improved.

In one embodiment, the robot has at least one robot arm and/or at least three, in particular at least six, in one embodiment at least seven joints, in one embodiment swivel joints, in particular a robot arm with at least three, in particular at least six, in one embodiment at least seven joints, in one embodiment swivel joints.

The present invention is particularly suitable for this purpose, in particular due to the possible uses and singularities.

In one embodiment, at least two first directions are displayed in one embodiment as not being monitored on the basis of detected joint loads by being displayed as such or by a corresponding identification such as a color or the like, in each of which first directions an external load on the reference is not reliably detectable on the basis of detected joint loads due to the vicinity to a singular position of the robot, or for which directions it has been determined that an external load on the reference is not reliably detectable on the basis of detected joint loads due to the vicinity to a singular position of the robot, in particular if it has been determined that an external load on the reference in said first directions is not reliably detectable on the basis of detected joint loads due to the vicinity to a singular position of the robot, and/or at least two second directions are displayed in one embodiment as being monitorable on the basis of detected joint loads by being displayed as such or by a corresponding identification such as a (possibly different) color or the like, in which second directions an external load on the reference is reliably detectable on the basis of detected joint loads despite the vicinity to a singular position of the robot, or for which it has been determined that an external load on the reference is reliably detectable on the basis of detected joint loads despite the vicinity to a singular position of the robot, in particular if it has been determined that an external load on the reference in these second directions is reliably detectable on the basis of detected joint loads despite the vicinity to a singular position of the robot.

In this way in one embodiment, more complex movements in the vicinity to a singular position can be planned or performed better, in particular more reliably, and the operation of the robot can thereby be (additionally) improved.

In one embodiment, only the first direction(s) is/are displayed, for example by activating appropriate illuminating means or symbols or the like, such that by being displayed as such, these direction(s) is/are displayed as not being monitored on the basis of detected joint loads.

In another embodiment, only the second direction(s) is/are displayed, for example by activating appropriate illuminating means or icons or the like, such that by being displayed as such, these direction(s) is/are displayed as being monitorable on the basis of detected joint loads.

In one embodiment, the clarity and hence the safety and therefore the operation of the robot can be (additionally) improved.

In another embodiment, both the first and second direction(s) are displayed, for example by activating corresponding illuminating means or symbols or the like, wherein then additionally by a corresponding identification, for example a different color, illuminating means, symbols or the like, the respective direction(s) is/are displayed as not being monitored on the basis of detected joint loads or as being monitorable on the basis of detected joint loads, purely by way of example e.g. direction(s) not monitored on the basis of detected joint loads or first direction(s) are displayed in a warning color, for example red, or with dashed or unfilled symbols or the like, and direction(s) monitorable on the basis of detected joint loads or second direction(s) are displayed in a another color, for example green, blue, white, or with solid or filled symbols or the like.

Two or more first directions or two or more second directions can (each) define a two-, three- or multidimensional hyperspace, for example two directions define a hyperspace in the form of a plane, in particular the (hyper) space of possible linear combinations of the directions. In one embodiment, a display of two or more first directions and/or a display of two or more second directions can comprise, in particular can be, a display of the corresponding space itself, such as a graphical visualization of a plane which is spanned by two first or second directions.

In one embodiment, a preferably visual and/or acoustic warning is output when an external load on the reference in the at least one first direction is not reliably detectable on the basis of detected joint loads due to the vicinity to a singular position of the robot.

In one embodiment, this may draw a user's attention to the displayed direction(s) as not being monitored on the basis of detected joint loads and thereby increase safety in particular and thereby (further) improve the operation of the robot.

In one embodiment, the at least one first direction, in a development the at least two first directions, is/are displayed on the robot, in one embodiment visualized, for example by corresponding illuminating means in the (respective) direction, color or the like.

Additionally or alternatively, in one embodiment the at least one second direction, in a development the at least two second directions, is/are displayed on the robot, in one embodiment visualized, for example by corresponding illuminating means in the (respective) direction, color or the like.

Additionally or alternatively, in one embodiment the warning is output on the robot, in particular visually and/or acoustically, in one embodiment displayed.

In one embodiment, this can increase safety and therefore (further) improve the operation of the robot.

Additionally or alternatively, in one embodiment the at least one first direction, in a development the at least two first directions, and/or the at least one second direction, in a development the at least two second directions, and/or the warning is/are output, in particular displayed, in one embodiment graphically visualized, for example by arrows and/or illuminating means and/or by means of animations or representations of the robot or the like, on a preferably portable control device, in one embodiment a handheld control device, for controlling the robot. In one embodiment, the control device for controlling the robot communicates with it or a robot controller, in particular in a wired manner or wirelessly, or is configured for this purpose, or is used for this purpose.

In one embodiment, this can (further) improve the ergonomics and therefore the operation of the robot.

Additionally or alternatively, in one embodiment the at least one first direction, in a development the at least two first directions, and/or the at least one second direction, in a development the at least two second directions, and/or the warning is/are output, in particular displayed in a simulation environment for simulating movement, in one embodiment graphically visualized, for example by arrows and/or by means of animations or representations of the robot or the like.

In one embodiment, this can increase safety and therefore (further) improve the operation of the robot.

In one embodiment, monitoring of an external load on the reference in the at least one second direction, in a development in the at least two second directions, is provided, in particular implemented or performed, during the movement of the reference.

In one embodiment, this can increase safety and therefore (further) improve the operation of the robot.

According to one embodiment of the present invention, which may be combined with the above-described aspect of the display or may be implemented independently like the latter, at least one or the at least one first direction is blocked for, in particular during, planning and/or performing a movement of a or the robot-fixed reference of a or the robot, if (it is determined that) an external load on the reference in said direction is not reliably detectable on the basis of detected joint loads due to the vicinity to a singular position of the robot, and if at least one first direction is blocked and multiple joints of the robot are simultaneously actuated, or while the at least one first direction is blocked and multiple joints of the robot are simultaneously actuated, a monitoring of an external load on the reference in at least one or the at least one second direction is provided on the basis of detected joint loads, in one embodiment implemented or performed, in which direction an external load on the reference is reliably detectable on the basis of detected joint loads despite the vicinity to the singular position.

By also allowing simultaneous actuation of multiple joints of the robot in the vicinity of the singular position and monitoring external loads on the reference in one or more resulting second directions on the basis of detected joint loads, the movement options can be expanded in one embodiment compared to DE 10 2017 204 211 A1, and/or safety can be increased, and the operation of the robot can therefore be improved.

As mentioned, the two aspects of the display and the blocking may be combined with one another by both displaying and blocking the first direction(s). In this way, the user can (more) easily recognize why a specific direction is currently not available. Likewise, the aspect of the display can also be realized without the blocking and the aspect of the blocking without the display, in particular since, as explained elsewhere, a user can deliberately choose a movement in the first direction despite the display if, for example, sufficient evasion space is present in this direction, or there are no obstacles in this direction.

In one embodiment, at least two first directions are blocked if external loads on the reference in said directions are not reliably detectable on the basis of detected joint loads due to the vicinity to a singular position of the robot.

Additionally or alternatively, in one embodiment, if at least one first direction is blocked and multiple joints are simultaneously actuated, monitoring of an external load on the reference in at least two second directions is provided on the basis of detected joint loads, in one embodiment implemented or performed, in which directions external loads on the reference are reliably detectable on the basis of detected joint loads despite the vicinity to the singular position.

In one embodiment, more complex movements in which external loads are reliably or not reliably detectable in different directions due to the vicinity to a singular position can therefore be better, in particular more reliably, planned or performed and therefore the operation of the robot is (further) improved.

In one embodiment, the at least one first direction or one or more of the first directions and/or the at least one second direction or one or more of the second directions has a translational and/or rotational direction, i.e. can in particular be a displacement, or a rotation, or a combination thereof.

Additionally or alternatively, in one embodiment the at least one first direction or one or more of the first directions and/or the at least one second direction or one or more of the second directions is/are determined on the basis of a Jacobian matrix between velocities of the reference and joint velocities. In one embodiment, the first direction or the first directions correspond(s) to a zero space, in one embodiment to a zero row or column, of the, in particular transposed, Jacobian matrix. In the determination on the basis of the Jacobian matrix, the Jacobian matrix can also be used in an indirect or combined form, for example in the form of a pseudoinverse, for example the Moore-Penrose pseudoinverse, of the Jacobian matrix, or the like.

By using the Jacobian matrix, the movement options can be expanded and/or safety increased, and therefore the operation of the robot can be improved in one embodiment compared to the heuristic approach of DE 10 2017 204 211 A1.

In one embodiment, the reference is a robot end flange-fixed reference, preferably the TCP. Since typically when operating robots, movement of a tool or workpiece attached to the robot end flange is intended, and often the robot end flange moves relatively quick(er) and/or has a wide(r) extension than other robot members, the present invention can be used with particular advantage for robot end flange-fixed references.

According to one embodiment of the present invention, a system for operating a robot or the robot, in particular hardware and/or software, in particular programming, is configured to carry out a method described herein and/or has:

means for displaying at least one first direction, in which an external load on the reference is not reliably detectable on the basis of detected joint loads due to the vicinity to a singular position of the robot, as not being monitored on the basis of detected joint loads, and/or at least one second direction, in which an external load on the reference is reliably detectable on the basis of detected joint loads despite the vicinity to the singular position, as being monitorable on the basis of detected joint loads, specifically for, in particular during, planning and/or performing a movement of a robot-fixed reference;

and/or means for blocking at least one first direction if an external load on the reference in said direction is not reliably detectable on the basis of detected joint loads due to the vicinity to a singular position of the robot, and for monitoring an external load on the reference in at least one second direction on the basis of detected joint loads, in which second direction an external load on the reference is reliably detectable on the basis of detected joint loads despite the vicinity to the singular position, if the direction is blocked and multiple joints of the robot are simultaneously actuated, specifically for, in particular during, planning and/or performing a movement of a robot-fixed reference.

In one embodiment, the system or its means comprises:

means for displaying at least two first directions as not being monitored on the basis of detected joint loads, in each of which directions an external load on the reference is not reliably detectable on the basis of detected joint loads due to the vicinity to a singular position of the robot, and/or for displaying at least two second directions as being monitorable on the basis of detected joint loads, in each of which directions an external load on the reference is reliably detectable on the basis of detected joint loads despite the vicinity to a singular position of the robot; and/or means for outputting a warning when an external load on the reference in the at least one first direction is not reliably detectable on the basis of detected joint loads due to the vicinity to a singular position of the robot; and/or means for outputting, in particular displaying, in particular graphically visualizing, the at least one first direction and/or the at least one second direction and/or the warning on the robot and/or an, in particular portable, control device for controlling the robot, and/or in a simulation environment for simulating the movement; and/or means for monitoring an external load on the reference in the at least one second direction on the basis of detected joint loads; and/or means for blocking at least two first directions if external loads on the reference in said directions are not reliably detectable on the basis of detected joint loads due to the vicinity to a singular position of the robot, and/or means for monitoring an external load on the reference in at least two second directions on the basis of detected joint loads, wherein in the second directions, external loads on the reference are reliably detectable on the basis of detected joint loads despite the vicinity to the singular position, if the first direction is blocked and multiple joints are simultaneously actuated.

A means within the meaning of the present invention may be designed in hardware and/or in software, and in particular may comprise a data-connected or signal-connected, in particular, digital, processing unit, in particular microprocessor unit (CPU), graphic card (GPU) having a memory and/or bus system or the like and/or one or a plurality of programs or program modules. The processing unit may be designed to process commands that are implemented as a program stored in a memory system, to detect input signals from a data bus and/or to output output signals to a data bus. A storage system may comprise one or a plurality of, in particular different, storage media, in particular optical, magnetic, solid-state, and/or other non-volatile media. The program may be designed in such a way that it embodies or is capable of carrying out the methods described herein, so that the processing unit is able to carry out the steps of such methods and thus, in particular, is able to operate the robot. In one embodiment, a computer program product may comprise—and may in particular be—a particularly non-volatile storage medium for storing a program, or having a program stored thereon, wherein an execution of this program causes a system or a controller, in particular a computer, to carry out the method described herein, or one or multiple steps thereof.

In one embodiment, one or more, in particular all, steps of the method are performed completely or partially automatically, in particular by the system or its means.

In one embodiment, the system comprises the robot.

In one embodiment, a load comprises a force in one direction and/or a torque in one direction.

In one embodiment, an external load on the reference is not reliably detectable on the basis of detected joint loads due to the vicinity to a singular position of the robot when a change in the detected joint loads falls below a certain minimum value due to a change in the external load, or an accuracy with which an external load is or can be determined on the basis of detected joint loads caused by the external load falls below a certain minimum value, or an inaccuracy with which an external load is or can be determined on the basis of detected joint loads caused by the external load exceeds a certain maximum value, or an external load on the reference is reliably detectable despite the vicinity to a singular position of the robot on the basis of detected joint loads if a change in the detected joint loads exceeds a certain minimum value as a result of a change in the external load, or an external load is or can be determined with a certain accuracy on the basis of detected joint loads caused by the external load, or an accuracy with which an external load is or can be determined on the basis of detected joint loads caused by the external load exceeds a certain minimum value, or an inaccuracy with which an external load is or can be determined on the basis of detected joint loads caused by the external load falls below a certain maximum value.

In one embodiment, a direction in the sense of the present invention has one or no specific direction. For example, the (bidirectional) vertical and the gravitational direction (vertically from top to bottom) can equally be a direction within the meaning of the present invention.

In one embodiment, the (respective) method also comprises the planning or performance of a movement of the robot-fixed reference, in particular with the displayed and/or blocked first direction(s) and/or displayed second direction(s).

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
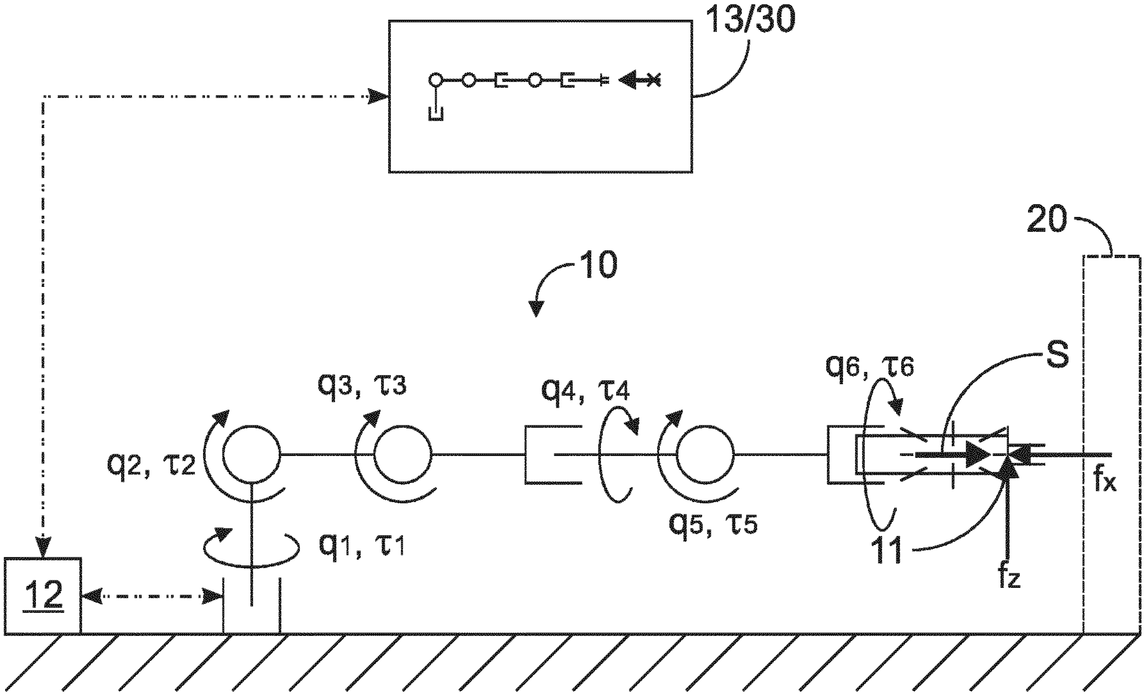
FIG. 1 schematically depicts a system for operating a robot according to one embodiment of the present invention.

FIG. 1 shows, by way of example, a six-axis or six-jointed robot (arm) 10, the joint positions or loads thereof are indicated by $q_1, \ldots, q_6$ (joint positions or rotational angles) or $\tau_1, \ldots, \tau_6$ (detected joint loads or torques), wherein the joint positions $q_1, \ldots, q_6$ determine the pose of its end flange and therefore of the TCP 11.

By way of example, an external load in the form of a horizontal force $f_x$, the line of action of which runs through the axes of rotation of the joints, and a vertical force $f_z$ are indicated at the TCP 11.

12 designates a robot controller with which a handheld control device 13 communicates.

In the vicinity of the illustrated singular position of the robot 10, the force $f_x$ can no longer be reliably detected on the basis of the detected joint loads $\tau_1, \ldots, \tau_6$; in the depicted singular position, it cannot be detected at all and therefore also cannot be reliably detected. This force direction can be determined on the basis of a Jacobian matrix between velocities of the reference and joint velocities, since the corresponding (first) column of the transposed Jacobian matrix $J^T$ has zeros in the singular position, since a force $f_x$ does not cause a non-zero torque in any of the joints.

In contrast, despite the vicinity to the illustrated singular position of the robot 10, the force $f_z$ can still be reliably detected on the basis of the detected joint loads $\tau_1, \ldots, \tau_6$, even in the illustrated singular position. This direction can also be determined on the basis of the Jacobian matrix, since the corresponding (third) column of the transposed Jacobian matrix $J^T$ has more than just zeros in the singular position, since the force $f_z$ causes different torques from zero in the second, third and fifth joint.

Figure 2:
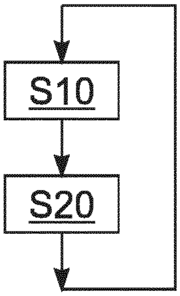
FIG. 2 is a flow chart of a method for operating the robot according to one embodiment of the present invention.

In each case, the robot controller 12 determines the Jacobian matrix on the basis of a current position of the robot (FIG. 2: step S10) and from this, (first) directions in which external loads on the reference 11 are not reliably detectable on the basis of detected joint loads due to the vicinity to a singular position of the robot $\tau_1, \ldots, \tau_6$.

These first directions are then indicated in a step S20 as not being monitored on the basis of detected joint loads, preferably on the robot, as indicated in FIG. 1 by a corresponding (activated) illuminating means S, and/or on the handheld control device 13, as indicated in FIG. 1 by a corresponding graphical visualization. In addition, for example, a visual and/or acoustic warning can be output, preferably on the robot and/or the handheld control device.

In this way, a user can recognize that forces in the horizontal direction in the vicinity of the position shown in FIG. 1 are not reliably detectable on the basis of detected joint loads.

If this is unproblematic, it can nevertheless command a movement in (one) of the first direction(s) (in the exemplary embodiment, this is only possible in positions that deviate slightly from the shown singular position).

However, if it determines, for example, that an obstacle 20 is present in the corresponding direction, there is the possibility that the robot will collide with the obstacle 20 without this being noticed by a collision monitoring system which determines external loads on the TCP 11 on the basis of the detected joint loads $\tau_1, \ldots, \tau_6$ and monitors them for exceeding limit values.

In a modification, in step S20 the first direction is not or not only indicated but, optionally additionally, blocked so that the user cannot command a movement of the TPC 11 in the horizontal direction in the vicinity of the position shown in FIG. 1.

In other, second directions, monitoring of external loads on the TCP is carried out, while the first direction is blocked and multiple joints of the robot are simultaneously actuated. For example, the comparison of FIG. 1 to FIGS. 3 and 4 of DE 10 2017 204 211 A1 illustrates that the joints 2, 3 and 5 can be actuated simultaneously, since the force in the second direction $f_z$ can be reliably detected despite the vicinity to the singular position, and the movement options can therefore be significantly expanded compared to DE 10 2017 204 211 A1.

Although embodiments have been explained in the preceding description, it is noted that a large number of modifications are possible.

The corresponding first directions can therefore also be displayed analogously when planning a movement, for example in a simulation environment 30. For a more compact illustration, the handheld control device 13 and the simulation environment 30 are illustrated by the same figure element in FIG. 1.

In addition or alternatively to the display of first directions, in a modification (not shown), second directions in which external loads on the reference are reliably detectable on the basis of detected joint loads despite the vicinity to the singular position can also be displayed (and preferably monitored) as being monitorable on the basis of detected joint loads, for example analogously to the symbol S on the robot 10 or analogously to the graphical visualization on the handheld control device 13 or in the simulation environment 30. As explained elsewhere, it may be advantageous to display only the first or only the second directions. Likewise, both first and second directions can also be displayed, purely by way of example in different colors, preferably first directions in a warning color.

Likewise, the corresponding first directions can also be blocked when planning a movement.

It is also noted that the embodiments are merely examples that are not intended to restrict the scope of protection, the applications, and the structure in any way. Rather, the preceding description provides a person skilled in the art with guidelines for implementing at least one exemplary embodiment, wherein various changes—in particular with regard to the function and arrangement of the described components—are able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

10 Robot (arm)
11 TCP (robot (end flange)-fixed reference)
12 Robot controller
13 Control device
20 Obstacle
30 Simulation environment
S Illuminating means
$q_1, \ldots, q_6$ Joint positions
$\tau_1, \ldots, \tau_6$ (Detected) joint loads
$f_x$, $f_z$ Force (external load)

The invention claimed is:

1. A method for operating a robot for planning and/or performing a movement of a robot-fixed reference, the method comprising:

at least one of:

visually displaying an indication that at least one first direction of movement of the robot fixed reference is not being monitored by a controller on the basis of detected joint loads, in which first direction an external load at the robot-fixed reference is not reliably detectable on the basis of detected joint loads due to the vicinity of the robot pose to a singularity position of the robot, or visually displaying an indication that at least one second direction of movement of the robot fixed reference is monitorable on the basis of detected joint loads, in which second direction an external load at the robot-fixed reference is reliably detectable on the basis of detected joint loads despite the vicinity of the robot pose to the singularity position;

actively blocking the robot-fixed reference against movement in the at least one first direction in response to an external load at the robot-fixed reference in the at least one first direction being not reliably detectable on the basis of detected joint loads due to the vicinity of the robot pose to a singularity position; and carrying out a monitoring process of an external load at the robot-fixed reference in the at least one second direction on the basis of detected joint loads in response to multiple joints of the robot being simultaneously actuated.

2. The method of claim 1, wherein at least one of:

at least two first directions are visually displayed as not being monitored on the basis of detected joint loads, in each of which first directions an external load at the robot fixed reference is not reliably detectable on the basis of detected joint loads due to the vicinity of the robot pose to a singularity position; or at least two second directions are visually displayed as being monitorable on the basis of detected joint loads, in each of which second directions an external load at the robot-fixed reference is reliably detectable on the basis of detected joint loads despite the vicinity of the robot pose to a singularity position.

3. The method of claim 1, further comprising:

outputting a warning when an external load at the robot-fixed reference in the at least one first direction is not reliably detectable on the basis of detected joint loads due to the vicinity of the robot pose to the singularity position of the robot.

4. The method of claim 1, wherein visually displaying an indication with respect to at least one of the at least one first direction of movement or the at least one second direction of movement comprises visually displaying the indication on at least one of:

the robot;

a control device for controlling the robot; or a simulation environment for simulating movement of the robot-fixed reference.

5. The method of claim 4, wherein visually displaying comprises graphically displaying.

6. The method of claim 3, wherein outputting a warning comprises visually displaying the warning on at least one of:

the robot;

a control device for controlling the robot; or a simulation environment for simulating movement of the robot-fixed reference.

7. The method of claim 1, further comprising:

during a movement of the robot-fixed reference, monitoring an external load at the robot-fixed reference in the at least one second direction on the basis of detected joint loads.

8. The method of claim 1, wherein at least one of:

blocking against movement in the at least one first direction comprises blocking at least two first directions;

carrying out the monitoring process in the at least one second direction comprises carrying out the monitoring process in at least two second directions.

9. The method of claim 1, wherein at least one of:

the at least one first direction has at least one of a translational direction or a rotational direction;

the at least one second direction has at least one of a translational direction or a rotational direction;

the at least one first direction is determined on the basis of a Jacobian matrix between velocities of the robot-fixed reference and joint velocities;

the at least one second direction is determined on the basis of a Jacobian matrix between velocities of the robot-fixed reference and joint velocities; or the robot-fixed reference is a robot end flange-fixed reference.

10. A system for operating a robot, the system comprising at least one of:

means for visually displaying at least one of:

an indication that at least one first direction of movement of the robot fixed reference is not being monitored by a controller on the basis of detected joint loads, in which first direction an external load at the robot-fixed reference is not reliably detectable on the basis of detected joint loads due to the vicinity of a pose of the robot to a singularity position of the robot, or an indication that at least one second direction of movement of the robot fixed reference is monitorable on the basis of detected joint loads, in which second direction an external load at the robot-fixed reference is reliably detectable on the basis of detected joint loads despite the vicinity of the robot pose to the singularity position; or means for:

actively blocking the robot-fixed reference against movement in the at least one first direction in response to an external load at the robot-fixed reference in the at least one first direction being not reliably detectable on the basis of detected joint loads due to the vicinity of the robot to a singular position, and carrying out a monitoring process of an external load at the robot-fixed reference in the at least one second direction on the basis of detected joint loads in response to the at least one first direction being blocked and multiple joints of the robot being simultaneously actuated.

11. A computer program product for operating a robot, the computer program product comprising a program code stored on a non-transitory, computer-readable medium, the program code, when executed on a computer, causing the computer to at least one of:

visually display at least one of:

an indication that at least one first direction of movement of a robot fixed reference is not being monitored by a controller on the basis of detected joint loads, in which first direction an external load at the robot-fixed reference is not reliably detectable on the basis of detected joint loads due to the vicinity of a pose of the robot to a singularity position of the robot, or an indication that at least one second direction of movement of the robot fixed reference is monitorable on the basis of detected joint loads, in which second direction an external load at the robot-fixed reference is reliably detectable on the basis of detected joint loads despite the vicinity of the robot pose to the singularity position; or perform the following:

actively block the robot-fixed reference against movement in the at least one first direction in response to an external load at the robot-fixed reference in the at least one first direction being not reliably detectable on the basis of detected joint loads due to the vicinity of the robot pose to a singularity position, and carry out a monitoring process of an external load at the robot-fixed reference in the at least one second direction on the basis of detected joint loads in response to the at least one first direction being blocked and multiple joints of the robot being simultaneously actuated.

* * * * *